United States Patent
Scott

(10) Patent No.: US 9,281,725 B2
(45) Date of Patent: Mar. 8, 2016

(54) ELECTRIC MACHINE AND METHOD OF MANUFACTURING THE SAME

(71) Applicant: Regal Beloit America, Inc., Beloit, WI (US)

(72) Inventor: Matthew James Scott, Dayton, OH (US)

(73) Assignee: Regal Beloit America, Inc., Beloit, WI (US)

(*) Notice: Subject to any disclaimer, the term of this patent is extended or adjusted under 35 U.S.C. 154(b) by 505 days.

(21) Appl. No.: 13/799,346

(22) Filed: Mar. 13, 2013

(65) Prior Publication Data

US 2014/0265685 A1 Sep. 18, 2014

(51) Int. Cl.
| | |
|---|---|
| *H02K 5/16* | (2006.01) |
| *H02K 5/173* | (2006.01) |
| *F16C 35/067* | (2006.01) |
| *F16C 19/10* | (2006.01) |
| *F16C 25/08* | (2006.01) |

(52) U.S. Cl.
CPC .............. *H02K 5/1732* (2013.01); *F16C 19/10* (2013.01); *F16C 25/083* (2013.01); *F16C 35/067* (2013.01); *F16C 2226/70* (2013.01); *F16C 2380/26* (2013.01)

(58) Field of Classification Search
CPC ....... H02K 5/173; H02K 5/1732; F16C 33/30
USPC ....................................... 310/89–90; 384/445
See application file for complete search history.

(56) References Cited

U.S. PATENT DOCUMENTS

| | | | |
|---|---|---|---|
| 2,762,198 A | 9/1956 | Ullery | |
| 2,926,051 A * | 2/1960 | Cazier | F16C 25/083 384/535 |
| 3,095,248 A * | 6/1963 | Lindgren | F16C 27/066 384/536 |
| 4,981,390 A * | 1/1991 | Cramer, Jr. | F16D 1/0835 403/355 |
| 5,013,990 A | 5/1991 | Weber | |
| 5,221,444 A | 6/1993 | Silveri | |
| 5,544,036 A | 8/1996 | Brown, Jr. | |
| 5,761,083 A | 6/1998 | Brown, Jr. | |
| 6,247,702 B1 | 6/2001 | Long | |
| 6,299,699 B1 | 10/2001 | Porat | |
| 6,778,893 B2 | 8/2004 | Murakami | |
| 7,610,671 B2 * | 11/2009 | Watkins | F16C 27/04 29/525.01 |
| 2002/0032511 A1 | 3/2002 | Murakami | |
| 2009/0151801 A1 | 6/2009 | Gorman | |

(Continued)

FOREIGN PATENT DOCUMENTS

| | | | |
|---|---|---|---|
| CN | 101012665 A | 8/2007 | |
| EP | 17685 A1 | 10/1980 | |

(Continued)

Primary Examiner — Thanh Lam
(74) Attorney, Agent, or Firm — John Wagley

(57) ABSTRACT

A bearing assembly cooperates with a bearing seat formed in a bearing housing. The assembly includes a bearing having an inner ring, an outer ring and a rolling element in engagement with the inner ring and the outer ring, and an anti-rotation device. The anti-rotation device engages the outer ring of the bearing and with the bearing housing to limit the rotation of the outer ring of the bearing within the bearing seat formed in the bearing housing. The anti-rotation device includes a first feature for engagement with the outer ring of the bearing and a second feature for engagement with the bearing housing. The first feature and the second feature limit the rotation of the outer ring of the bearing within the bearing seat formed in the bearing housing.

20 Claims, 7 Drawing Sheets

(56) References Cited

U.S. PATENT DOCUMENTS

| | | | |
|---|---|---|---|
| 2009/0273250 A1* | 11/2009 | Huesges | H02K 5/1672 310/90 |
| 2012/0029705 A1 | 2/2012 | Broniak | |
| 2012/0053737 A1 | 3/2012 | Valluri | |
| 2012/0073040 A1 | 3/2012 | Cohen | |
| 2012/0104878 A1 | 5/2012 | Heilman | |
| 2012/0107140 A1 | 5/2012 | Stiles, Jr. | |
| 2012/0219428 A1 | 8/2012 | Cantolino | |

FOREIGN PATENT DOCUMENTS

| | | | |
|---|---|---|---|
| EP | 17685 | B1 | 3/1984 |
| EP | 1041220 | A2 | 10/2000 |
| EP | 1147332 | B1 | 9/2004 |
| EP | 1041220 | B1 | 9/2007 |
| GB | 590788 | A | 7/1947 |
| GB | 814078 | A | 5/1959 |
| GB | 912374 | A | 12/1962 |
| JP | 2000339036 | A | 12/2000 |
| JP | 2002051963 | A | 2/2002 |
| JP | 03302788 | B2 | 7/2002 |
| JP | 2006029372 | A | 2/2006 |
| JP | 2006226318 | A | 8/2006 |
| JP | 2007309383 | A | 11/2007 |
| JP | 2009029578 | A | 2/2009 |
| JP | 2011163486 | A | 8/2011 |
| JP | 2011174484 | A | 9/2011 |
| JP | 2011174486 | A | 9/2011 |
| JP | 2012072694 | A | 4/2012 |
| WO | 2006124006 | A2 | 11/2006 |
| WO | 2009076565 | A1 | 6/2009 |

* cited by examiner

ELECTRIC MACHINE AND METHOD OF MANUFACTURING THE SAME

BACKGROUND OF THE INVENTION

The embodiments described herein relate generally to an electric machine, and more specifically, to a bearing assembly with a relative motion [bearing creep] impeding device associated with the electric machine.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil.

The centrally located shaft supports a rotor. The rotor is the non-stationary part of a rotary electric motor, electric generator or alternator. Motor efficiency is improved by decreasing the degree of slip between the rotor and the stator for a given load. One way to decrease the slip is by increasing the mass of the rotor. The rotor includes conductors, conductor bars and end-plates which transfer current, magnetic field and torque to the rotor and consequently torque to the shaft.

The shaft rotatably supports the substantial weight of the rotor within the electric machine. At least one bearing and typically a pair of spaced apart bearings support the shaft within a housing of the electric machine. The bearings may be any bearing capable of supporting the loads involved and of enduring the rotational speeds of the motor. Typically modern electric machines utilize rolling element bearings, typically ball bearings to support the shaft and rotor. The ball bearings include an inner ring and an outer ring separated by a series of spherical elements or balls. While the shaft is typically rigidly secured to the inner ring, the outer ring is permitted to move axial in the housing, to accommodate various phenomenon including temperature changes, dissimilar materials, and tolerance stacks.

When the bearing is positioned with the shaft horizontal to the horizon or ground, a substantial radial load from the rotor is applied to the bearing. This radial load serves to inhibit relative motion or rotation of the bearing outer ring in the housing. However when the bearing is positioned with the shaft vertical with respect to the horizon or ground, radial loads can be zero or minimal, permitting relative slippage to occur between the bearing outer ring and the housing.

The initial relative slippage is exasperated by the formation of metal debris that forms a lapping compound between the bearing outer ring and the housing bore. This lapping may quickly greatly enlarge the housing bore, causing excessive noise and excessive movement between the motor stator and the motor rotor, resulting in rotor/stator strike. The noise and strike may lead to early bearing and resultant motor failure.

Many practical applications utilize motors with vertical shafts. For example, pumps for pools and spas and cooling fans, particularly those to cool air conditioning compressors. These applications are plagued with bearing failures caused by the relative motion of the motor bearing outer ring in the motor housing, also known as bearing creep. Typically, vertical cooling fan motors have a vertical shaft extending upwardly from the motor and from which a fan is attached. The motor typically has an upper unconstrained bearing and a lower constrained bearing. The upper unconstrained bearing, being closer to the fan, has a greater tendency for creep, but creep can occur in any bearing application, particularly those where accommodation is made for the bearing to move axially with respect to its housing.

Various methods are used to limit the bearing creep. One method is to eliminate any relative motion, including axial motion, by providing an interference fit between the bearing outer ring and the housing or by using an adhesive between the outer ring and housing. However any solution that eliminates all relative motion has the disadvantage of not accommodating various phenomenon including temperature changes, dissimilar materials, and tolerance stacks that affect the relative axial position of the inner ring with respect to the outer ring. Such a solution may result in excessive bearing preloads and reduced bearing life. Further, interference fit between both bearing races is not recommended by bearing manufacturers.

Other methods, such as placing an o-ring, a polymer ring, an EC (expansion compensating bearing), between the bearing and the housing are either ineffective or not sufficiently durable. The present invention is directed to alleviate at least some of these problems with the prior art.

BRIEF DESCRIPTION OF THE INVENTION

In one aspect, a bearing assembly for use in an electric machine is provided. The assembly cooperates with a bearing seat formed in a bearing housing. The assembly includes a bearing and an anti-rotation device. The bearing includes an inner ring, an outer ring and a rolling element in engagement with the inner ring and the outer ring. The anti-rotation device is adapted for engagement with the outer ring of the bearing and with the bearing housing to limit the rotation of the outer ring of the bearing within the bearing seat formed in the bearing housing. The anti-rotation device includes a first feature for engagement with the outer ring of the bearing and a second feature for engagement with the bearing housing. The first feature and the second feature are adapted to limit the rotation of the outer ring of the bearing within the bearing seat formed in the bearing housing.

In another aspect, an anti-rotation device for use with a bearing in an electric machine is provided. The anti-rotation device is adapted for engagement with the outer ring of the bearing and with the bearing housing to limit the rotation of the outer ring of the bearing within the bearing seat formed in the bearing housing. The anti-rotation device includes a first feature for engagement with the outer ring of the bearing and a second feature for engagement with the bearing housing. The first feature and the second feature are adapted to limit the rotation of the outer ring of the bearing within the bearing seat formed in the bearing housing. The first feature includes an internal surface for engagement with the outer ring of the bearing and the second feature includes an engagement surface for engagement with a protrusion extending from the bearing housing.

In yet another aspect, an electric machine includes a housing, a stator secured to the housing and a rotor. The rotor is rotatable associated with the housing and is supported by a shaft. The machine also includes a bearing and an anti-rotation device. The bearing has an inner ring and an outer ring. The bearing is mounted in and rotatably secures the rotor to the housing. The anti-rotation device engages the outer ring of the bearing and the bearing housing to limit the rotation of the outer ring of the bearing within the bearing seat formed in the bearing housing. The anti-rotation device includes a first feature for engagement with the outer ring of the bearing and a second feature for engagement with the bearing housing. The first feature and the second feature limit the rotation of the outer ring of the bearing within the bearing housing. The first feature includes an internal surface for engagement with the outer ring of the bearing and the second feature comprises a engagement surface for engagement with a protrusion extending from the bearing housing.

In yet another aspect, a method for containing a bearing in an electric machine includes the steps of providing an anti-rotation device for use with a bearing having an inner ring and an outer ring, engaging the anti-rotation device with the outer ring of the bearing, and engaging the anti-rotation device with the bearing housing to limit the rotation of the outer ring of the bearing within the bearing seat formed in the bearing housing.

DETAILED DESCRIPTION OF THE INVENTION

The methods, systems, and apparatus described herein provide improved support for a rotor within a stator of an electric machine. Bearings that support the rotor in the stator need to provide for axial movement of the bearing relative to the machine housing, while inhibiting rotation of the bearing outer ring in the bearing housing. Difficulties may occur providing for the axial movement, while inhibiting rotation. Bearing creep may occur resulting in noise and reduced life for the electric machine.

The methods, systems, and apparatus described herein assist in the proper support for a rotor within a stator of an electric machine. The methods, systems, and apparatus described herein may also facilitate quieter operation and increased speed. Furthermore, the methods, systems, and apparatus described herein provide for an improved life and durability of the motor and its appeal to the customer.

Technical effects of the methods, systems, and apparatus described herein include at least one of improved performance and quality and reduced labor costs.

Figure 1:
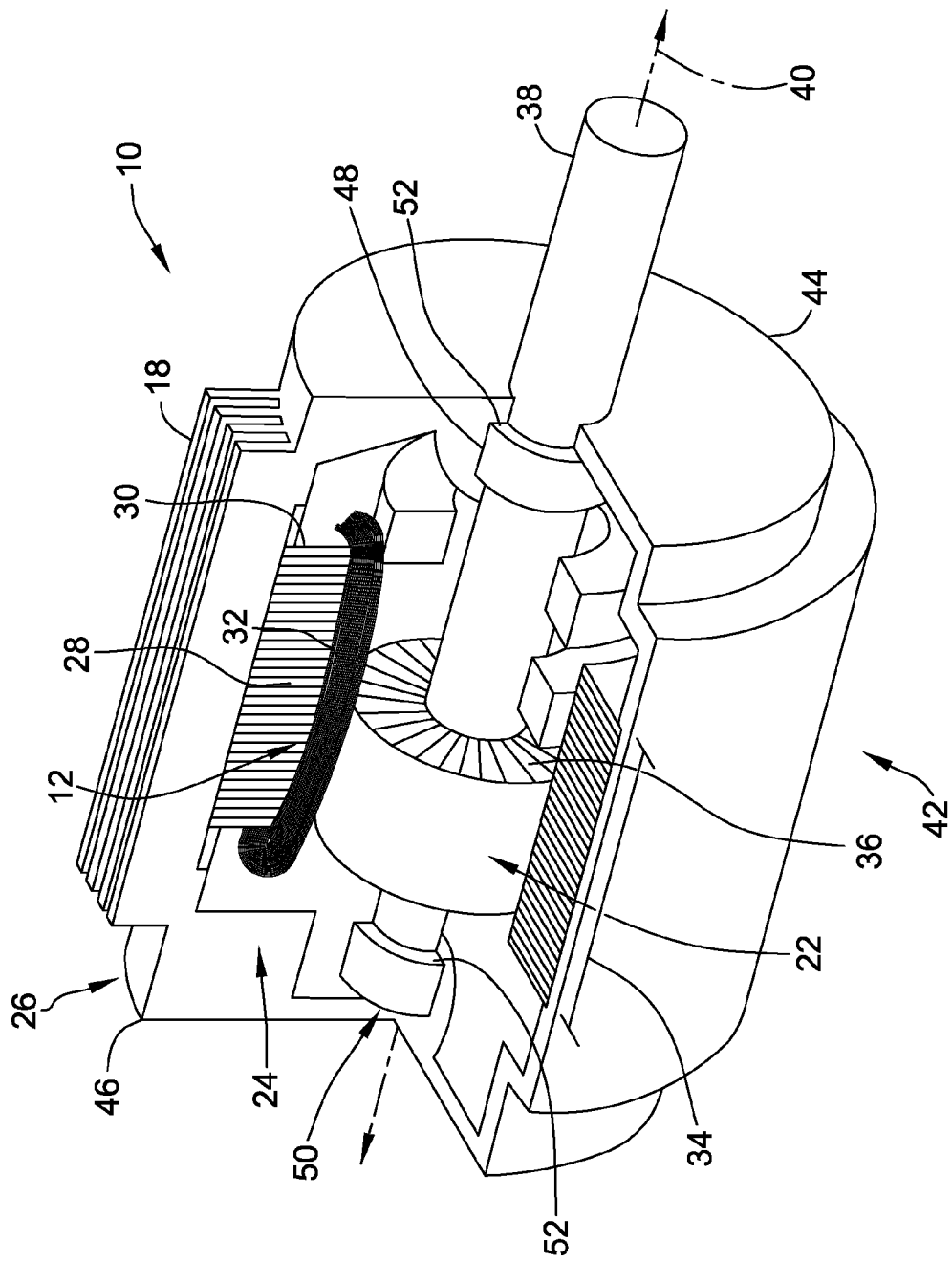
FIG. 1 is a perspective view of a motor embodying the bearing assembly with the anti-rotation device of the present invention.

FIG. 1 is a perspective view of an exemplary electric machine 10. While the machine 10 may be any electric machine including generators and motors, typically the machine is an electric motor. The motor 10 may have any orientation, horizontal, vertical or otherwise. As shown the motor has a vertical orientation with the shaft extending upwardly out of the motor housing.

The electric machine 10 includes a stationary assembly 12. Electric machine 10 also includes a machine assembly housing 18 and a rotatable assembly 22. Machine assembly housing 18 defines an interior 24 and an exterior 26 of machine 10 and is configured to at least partially enclose and protect stationary assembly 12 and rotatable assembly 22. Stationary assembly 12 includes a stator core 28, which includes a plurality of stator teeth or projections 30. Stator end caps are positioned over opposed end teeth of the plurality of stator teeth 30. Wire is wound around stator teeth 30 and the stator end caps to form each of a plurality of windings 32.

In an exemplary embodiment, stationary assembly 12 is a three phase salient pole stator assembly. Stator core 28 is formed from a stack of laminations made of a highly magnetically permeable material, and windings 32 are wound on stator core 28 in a manner known to those of ordinary skill in the art. Laminations are stacked such that stator core 28 reaches a predefined length 34. In the exemplary embodiment, the plurality of laminations that form the stator core 28 may be either interlocked or loose laminations. In an alternative embodiment, stator core 28 is a solid core. For example, stator core 28 may be formed from a soft magnetic composite (SMC) material, a soft magnetic alloy (SMA) material, and/or a powdered ferrite material using a sintering process. In another alternate embodiment, the windings 32 are wound around a plurality of spools (not shown), each of which is removably fitted to one of the stator teeth 30.

In one embodiment, rotatable assembly 22 includes a permanent magnet rotor core 36 and a shaft 38 and is configured to rotate around an axis of rotation 40. In the exemplary embodiment, rotor core 36 is formed from a stack of laminations made of a magnetically permeable material and is substantially received in a central bore of stator core 28. While FIG. 1 is an illustration of a three phase electric motor, the methods and apparatus described herein may be included within machines having any number of phases, including single phase and multiple phase electric machines.

In the exemplary embodiment, electric machine 10 is coupled to a fan (not shown) for moving air through an air handling system, for blowing air over cooling coils, and/or for driving a compressor within an air conditioning/refrigeration system. The shaft 38 of the machine 10 extends as shown vertically upward from the machine and is used to secure the fan to the shaft. Alternatively the electric machine may be coupled to a pump for use in pools, spas, and the like. More specifically, machine 10 may be used in air moving applications used in the heating, ventilation, and air conditioning (HVAC) industry, for example, in residential applications using ⅓ horsepower (hp) to 1 hp motors or greater and/or in commercial and industrial applications and hermetic compressor motors used in air conditioning applications using higher horsepower motors, for example, but not limited to using ⅓ hp to 7.5 hp motor or greater. Although described herein in the context of an air handling system, electric machine 10 may engage any suitable work component and be configured to drive such a work component. Alternatively, electric machine 10 may be coupled to a power conversion component, for example, an engine, a wind turbine rotor, and/or any other component configured to rotate rotatable assembly 22 to generate electricity using electric machine 10.

Continuing to refer to FIG. 1, the housing 18 of motor 10 includes a central portion 42 and opposed motor end caps 44 and 46, secured to central portion 42 of housing 18. Bearing assemblies 48 and 50 are mounted in end caps 44 and 46, respectively and support the shaft 38 of rotor 22 for rotation within housing 18 of motor 10. It should be appreciated that only one end cap may be used with the other end cap being integral with the central portion of the housing.

According to the present invention, one or both of the bearing assemblies 48 and 50 include an anti-rotation device 52 according to the present invention. The bearing assemblies 48 and 50 support opposed ends of shaft 38. As shown bearing assembly 48 in the upper end cap 44 is typically is not captive to the cap 44 (the bearing assembly 48 is unconstrained (not contained on its lower side and can move to the down relative to end cap 44). Conversely, the bearing assembly 50 in the lower end cap 46 is typically constrained. The shaft 38 in turn supports a rotor, for example and as shown, permanent magnet rotor core 36.

Figure 2:
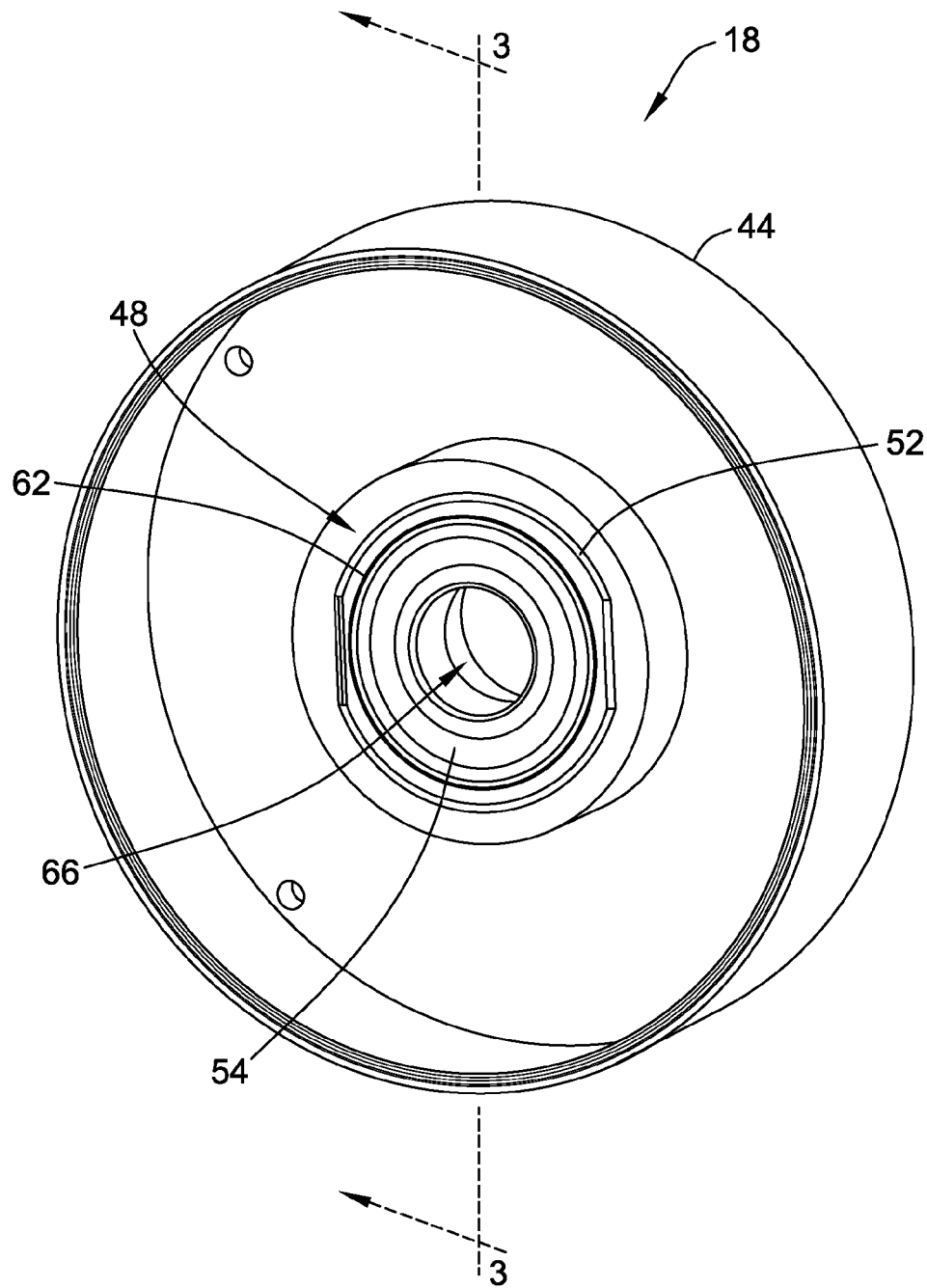
FIG. 2 is a perspective view of an end cap of the motor of FIG. 1 showing the bearing assembly with the anti-rotation device of the present invention installed into the end cap portion of the housing of the motor of FIG. 1.
Figure 3:
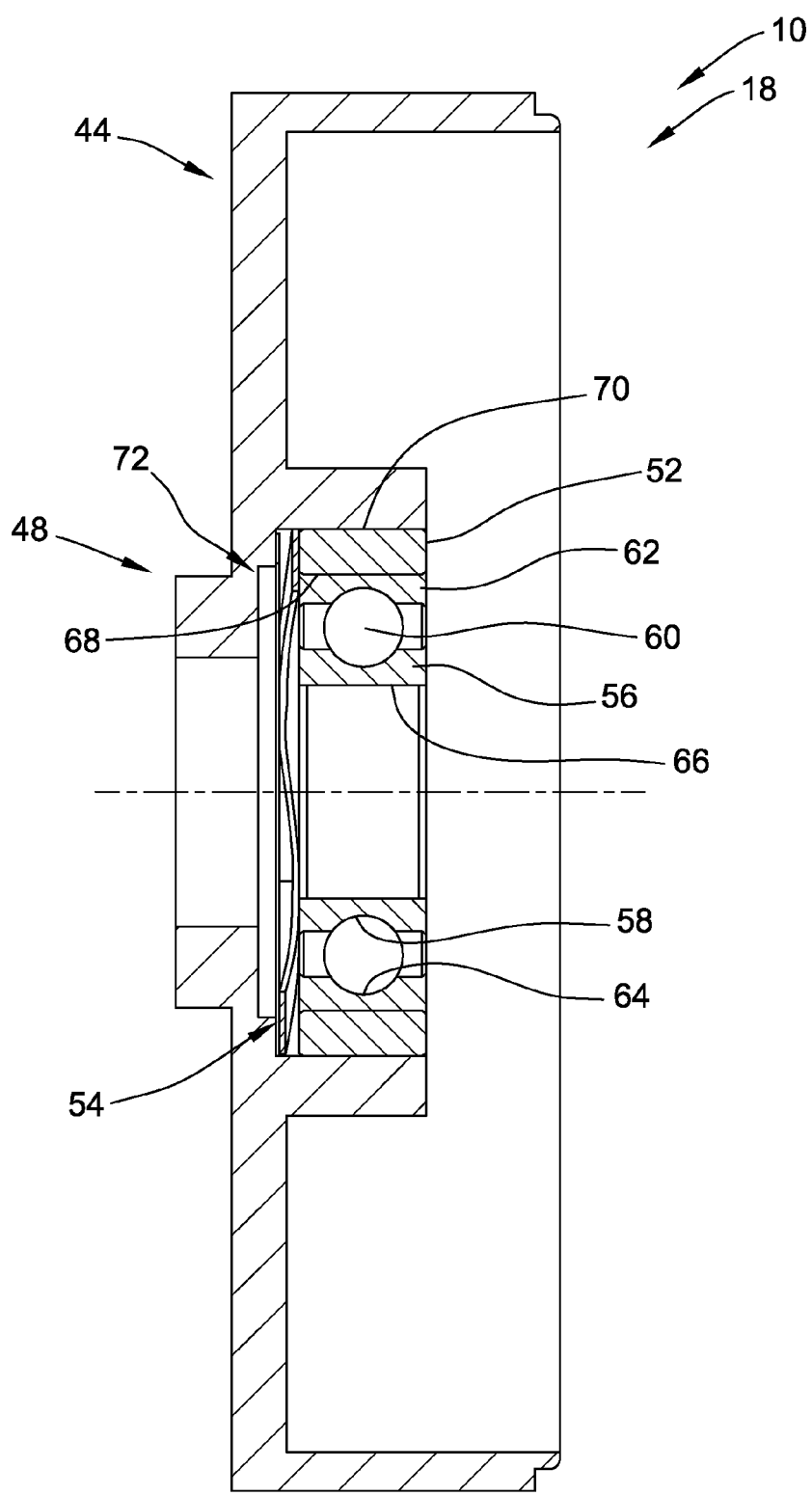
FIG. 3 is a cross sectional view of the end cap of FIG. 2 along the line 3-3 in the direction of the arrows.

Referring now to FIGS. 2 and 3, the bearing assembly 48 is shown in greater detail. It should be appreciated that the bearing assembly 48 and the bearing assembly 50 may be similar, and for simplification identical to each other. Therefore the description of bearing assembly 48 may equally apply to bearing assembly 50. The bearing assembly 48 includes the anti-rotation device 52 as well as bearing 54.

Referring again to FIG. 1, the bearing may be any bearing capable of supporting the rotor core 36. For example the bearing may be any type of rolling element bearing. To permit operation speeds for modern electrical machine and to provide sufficient bearing life and as shown in FIG. 3, the bearing may be a ball bearing 54. The bearing 54 includes an inner ring 56 surrounded on its outer periphery or inner race 58 by rolling elements or balls 60. A bearing ball retainer, not shown, may be used to space the balls 60 about the bearing 54. An outer ring 62 surrounds balls 60 on inner periphery or outer race 64 of outer ring 62.

The inner ring 56 includes an inner surface or bore 66 to which the shaft 38 (see FIG. 1) is fitted. The shaft 38 may have any suitable fit with the bore 66 and may be in clearance, slip fit or interference fit with the bore 66. The shaft may be fixed to the bore of bearing by a press or interference fit or may be locked to it by adhesives or a device, such as a bearing collar, not shown.

According to the present invention and as shown in FIGS. 2 and 3, the bearing assembly includes the anti-rotation device 52. The anti-rotation device 52, as shown, engages the outer ring 62 of bearing 54. The device 52 may engage the outer ring 62 at any position of the device and at any position of the ring. As shown the device has a device bore 68 which engages outer periphery or outside diameter 70 of outer ring 62 of bearing 54.

As shown in FIG. 3, the upper end cap 44 is on the loaded end of the motor 10, where the outer ring 62 is not captive to the cap 44 (the outer ring 62 is not contained below or on the right of the ring 62 and can move to the right or downwardly relative to end cap 44 as shown). It should be appreciated that the anti-rotation device 52 may also be used on lower end cap 46 (see FIG. 1) which may be the non-loaded end of the motor 10. In such an application, the anti-rotation device 52 could be used as a method of capturing the outer ring of the bearing of bearing assembly 50 (see FIG. 1) from rotation within end cap and may replace or supplement normal locking mechanisms such as clamps.

The device 52 may engage the outer ring 62 in any effective way, by a bearing engagement feature or first engagement feature 72, for example, feature 72 may be in the form of providing a device (not shown) or the feature 72 may be an adhesive, or the device and the ring may have mating features (not shown) to engage each others. As shown in FIG. 3, the feature 72 is in the form of an interference fit between device bore 68 of device 52 and the outer periphery or outside diameter 70 of outer ring 62 of bearing 54.

The anti-rotation device 52, as shown, also engages the motor assembly housing 18 (see FIG. 1) in any effective way, by a second feature or device engagement feature 74, for example, feature 74 may be in the form of providing a device (not shown) or, as shown, the feature 74 may cooperate with a mating feature on the housing 18 to engage each other.

Figure 4:
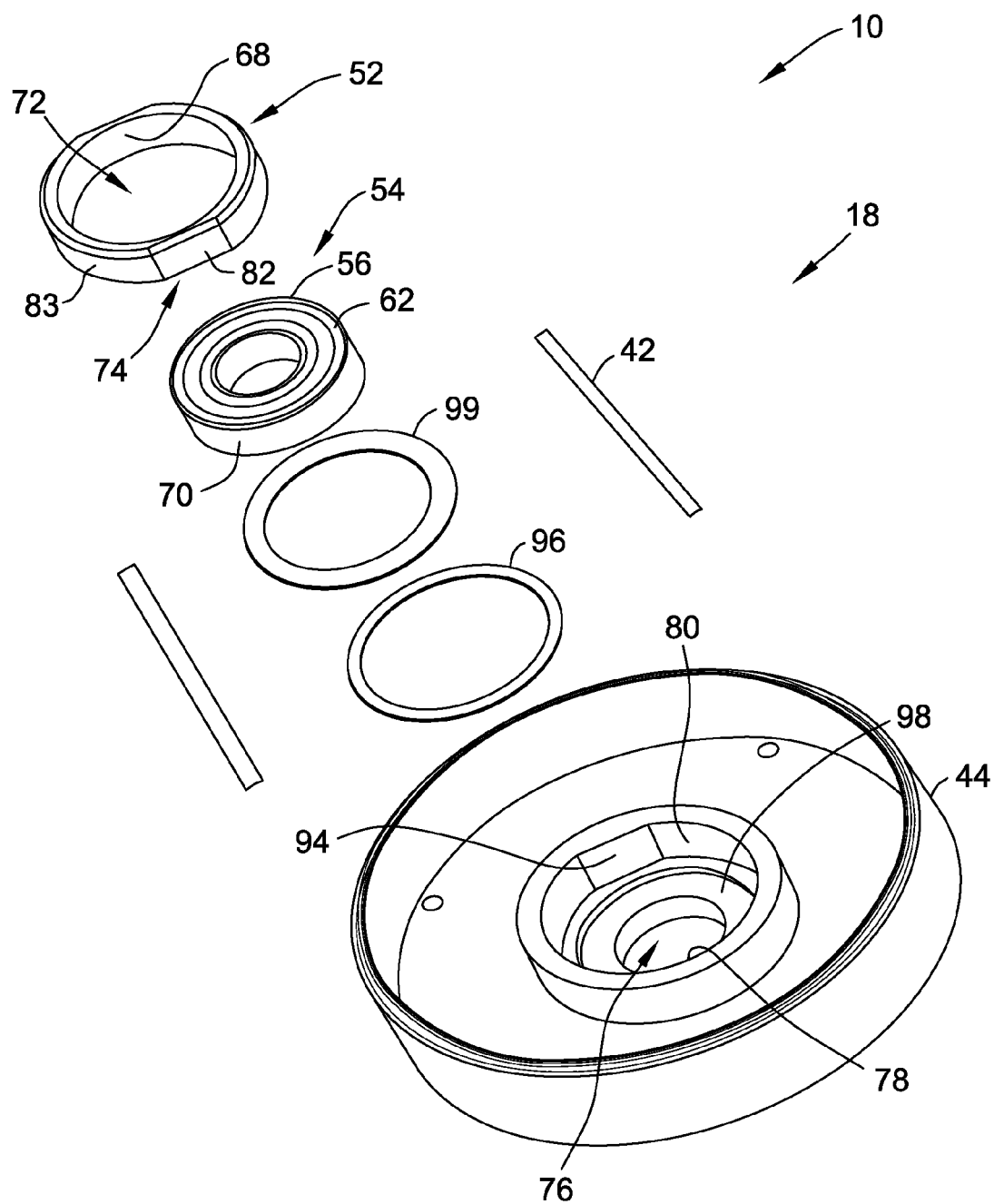
FIG. 4 is an exploded perspective view of the end cap of FIG. 2 with the anti-rotation device of the present invention for use in the motor of FIG. 1.

As shown in greater detail in FIG. 4, the second feature or second engagement feature 74 is in the form of a void 74 defined by an engagement surface. The engagement surface is created by making in any way a surface below the periphery of outer diameter 70 of the anti-rotation device 52. For example the engagement surface may be in the form of a flat on the outer periphery 70 of the anti-rotation device 52. Note that the engagement surface may have any shape such as polygon, arcuate, or any irregular shape formed into outer periphery 70 of device 52. The void 74 of the anti-rotation device 52 cooperates with a housing engagement feature 76 located on the assembly housing 18. The housing engagement feature 76 may be any feature that cooperates with the device engagement feature 74 to inhibit rotation of the device 52 in bearing outer ring 62 of bearing 54. The housing engagement feature 76 may be a separate component or, as shown, be integral with housing 18 (or end cap 44 of housing 18). The housing engagement feature 76 as shown is a protrusion 76 that extends into void 74 of the anti-rotation device 52 with the protrusion 76 engaging the flat formed on the outer periphery 70 of device 52.

While the void 74 and the protrusion 76 may have any shape, for simplicity and as shown in FIG. 4, the protrusion 76 is defined by a housing flat 78 formed in housing bore 80 of end cap 44 of housing 18. For simplicity and to provide an effective mating feature, the void 74 is defined by an anti-rotation device flat 82 formed on the anti-rotation device 52. To permit axial movement of the bearing 54 in the end cap 44 of housing 18, outer surface 83 of anti-rotation device 52 is preferably in a mating fit/clearance with housing bore 80 and the anti-rotation device flat 82 is preferably in a mating fit/clearance with housing flat 78. The clearance of the anti-rotation device 52 with the housing bore 80 may permit a slight relative angular movement between each other which may be less than 30 degrees or from 0 to 15 degrees.

Figure 5:
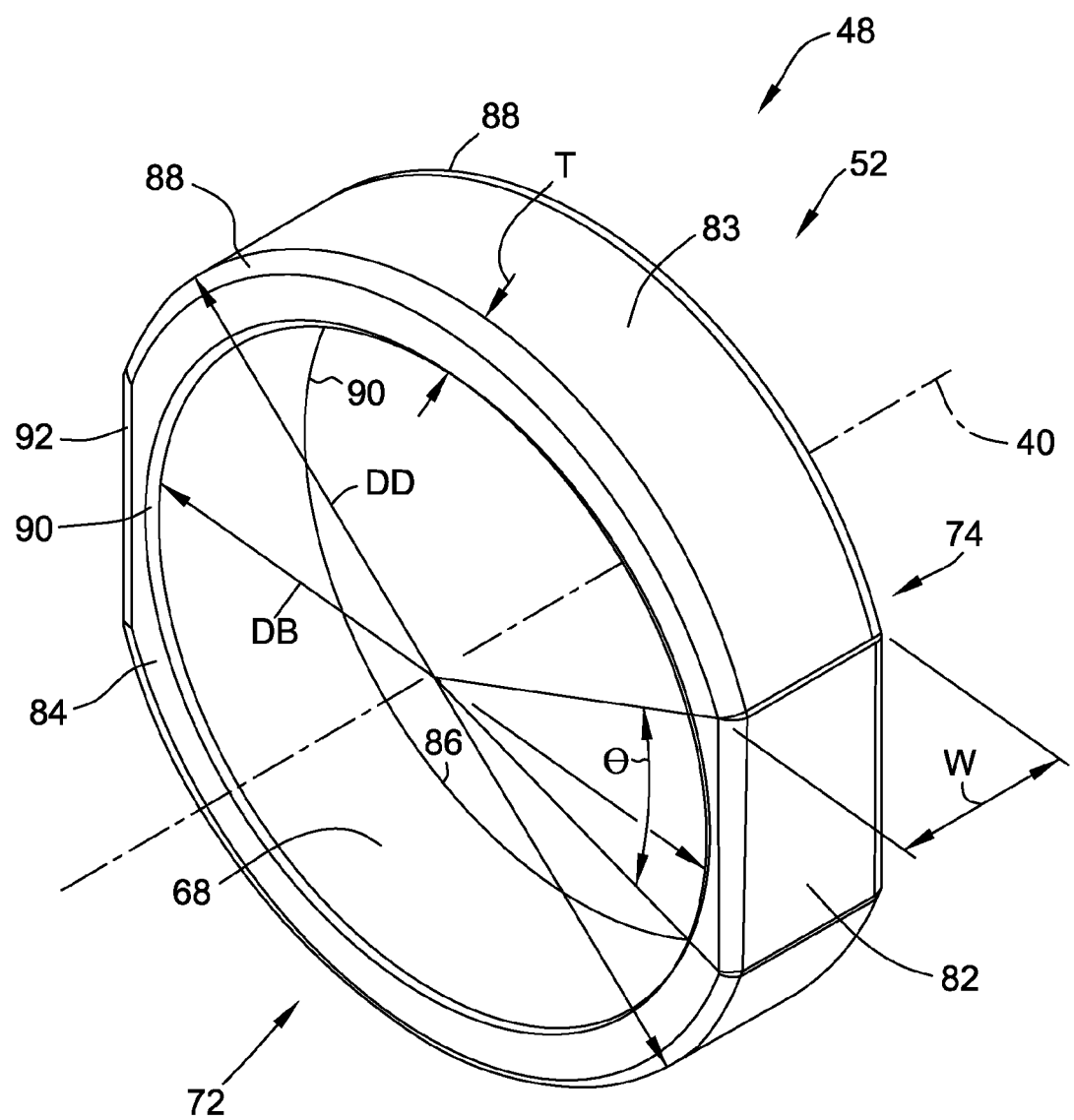
FIG. 5 is a perspective view of the anti-rotation device of the present invention.

Referring now to FIG. 5, the anti-rotation device 52 is shown in greater detail. The anti-rotation device 52, as shown, is generally in the shape of a ring defined by outer surface 83, bore 68 and opposed first and second faces 84 and 86, respectively. Outer edges 88 formed between the faces 84 and 86 and outer surface 83 may be rounded, as shown, or chamfered. Likewise inner edges 90 between the faces 84 and 86 and bore 68 may be rounded or chamfered, as shown.

In addition to the engagement feature 74 in the form of void 74, additional engagement features may be provided with the anti-rotation device 52. For example, and as shown in FIG. 5, the anti-rotation device 52 may include an additional engagement feature defined by second device flat 92 which engages second housing flat 94 (see FIG. 4). It should be appreciated that the void may be on the housing and the protrusion may be on the anti-rotation device.

Continuing to refer to FIG. 5, the second device flat may be similar to first device flat 82 and may be positioned anywhere else on the outer surface 83 of device 52. As shown and for simplicity, the second device flat 92 is positioned opposed to first device flat 82.

The anti-rotation device 52 may have any desired size and shape and as shown in FIG. 4, is sized to slidably fit with bore 80 of end cap 44 and to be fixedly secured to bearing outer ring 62.

Referring again to FIG. 5, the anti-rotation device 52 has a width W between the first face 84 and the second face 86. The bore 68 of device 52 has a diameter of DB and the device 52 has an outside diameter of DD. The flat 82 is defined by an angle Θ from centerline 40 of device 52. Width W may be the same as the width of bearing 54, as shown, or smaller or larger.

The anti-rotation device 52 may be made of any suitable durable material or materials and may, for example be made of a metal, a polymer or a composite material. The device may be made by and suitable process, such as molding, casting, forming or machining, etc.

Figure 6:
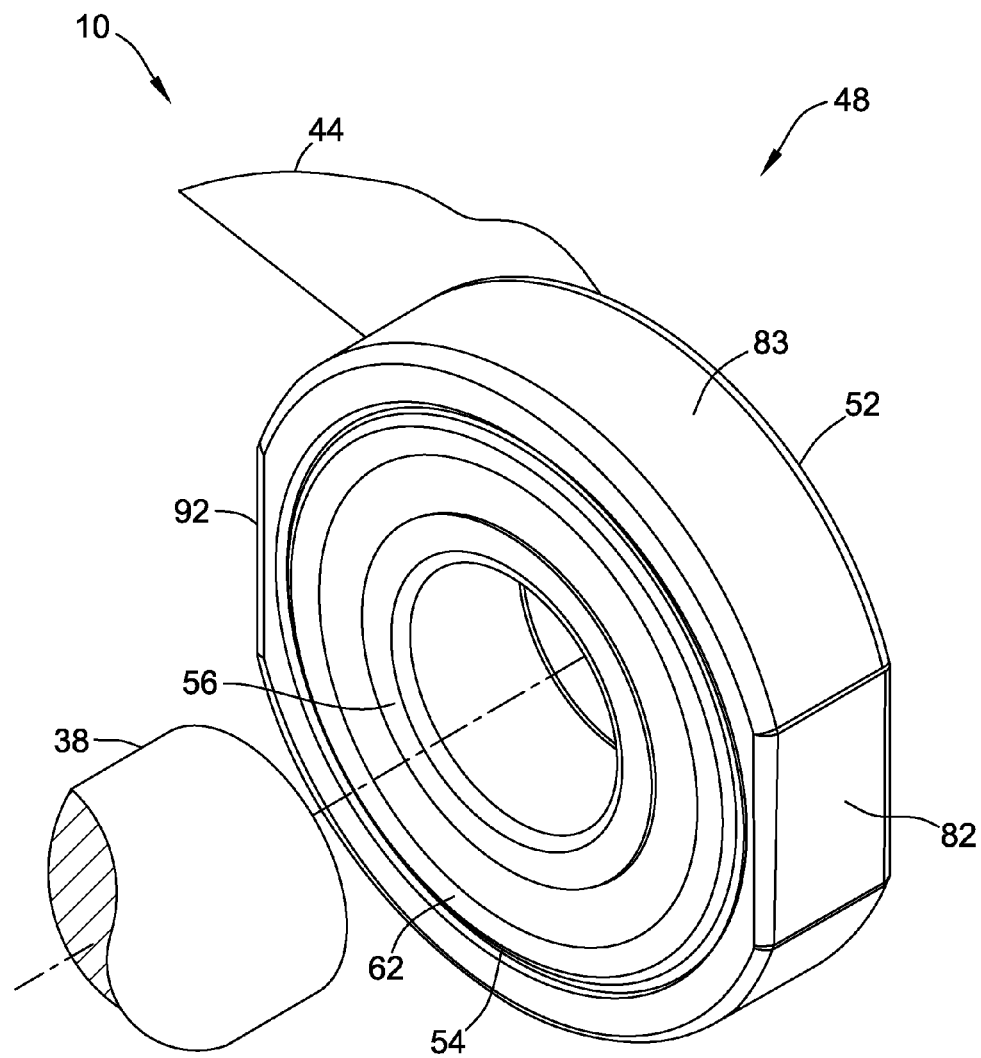
FIG. 6 is a perspective view of the anti-rotation device of FIG. 5 installed into a bearing to form the bearing assembly of the present invention.

Referring now to FIG. 6, anti-rotation device 52 is shown assembled over the bearing 54 to form bearing assembly 48.

Referring again to FIG. 4, the anti-rotation device 52, the bearing 54, are shown in an exploded position for assembly into bore 80 of end cap 44 of housing 18 of motor 10. It should be appreciated that additional components may be used to complete the motor 10 of present invention. For example, as shown, a backing ring 96 may be positioned against housing bore face 98 of end cap 44. Further, for example and as shown a wavy washer 99 may be positioned between the backing ring 96 and bearing 54.

Figure 7:
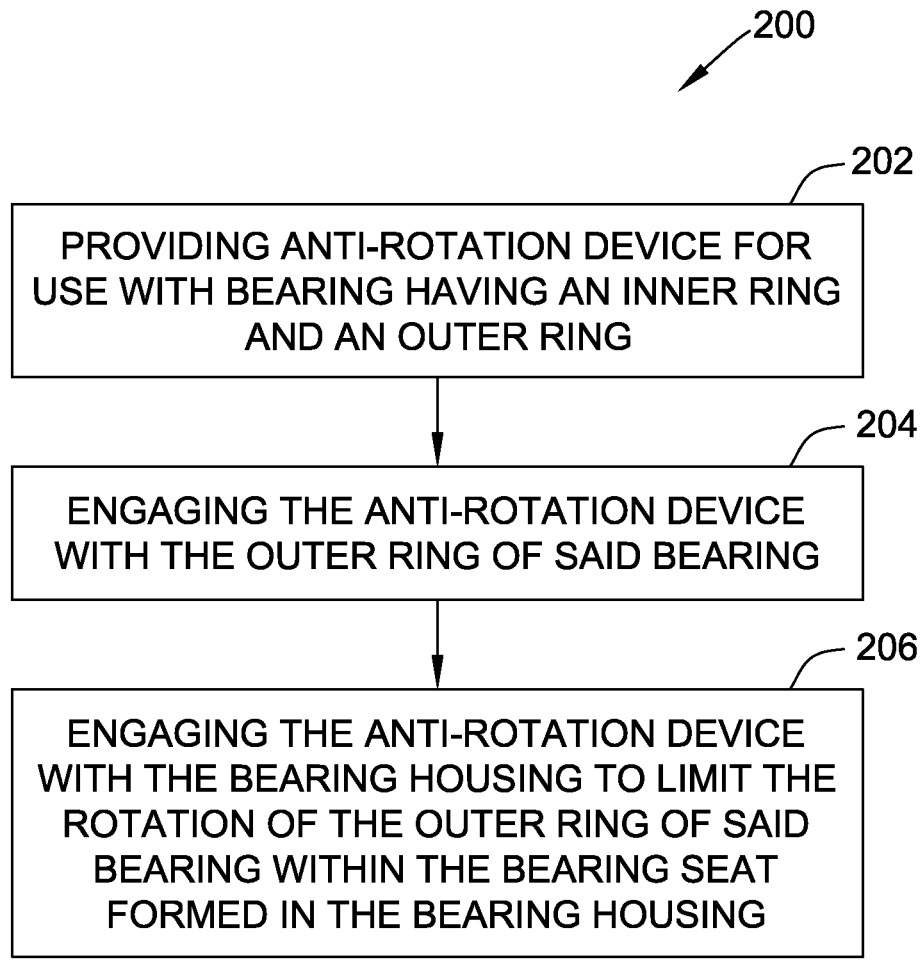
FIG. 7 is a flow chart of an exemplary method for utilizing the anti-rotation device as shown in FIG. 5.

Referring now to FIG. 7, a flow chart of an exemplary method 200 for containing a bearing in an electric machine (see FIG. 1) is shown. The method 200 includes the step 202 of providing anti-rotation device 52 (see FIG. 4) for use with bearing 54 having an inner ring and an outer ring, the step 204 of engaging the anti-rotation device with the outer ring of said bearing and the step 206 of engaging the anti-rotation device with the bearing housing to limit the rotation of the outer ring of said bearing within the bearing seat formed in the bearing housing.

Referring again to FIGS. 3-7, another aspect of the exemplary method 200 may be in the form of the method for containing bearing 54. The anti-rotation device 52 includes the first feature 72 for engagement with the outer ring 62 of the bearing 54. The anti-rotation device 52 also includes a second feature 74 for engagement with the bearing housing 18. The first feature 72 and said second feature 74 are adapted to limit the rotation of the outer ring 62 of the bearing 54 within the bearing housing 18. The first feature 72 includes an internal surface 68 for engagement with the outer ring 62 of the bearing 54. The second feature 74 includes a void or recess 74 defined by an engagement surface for engagement with a protrusion 76 extending from the bearing housing 18. The anti-rotation device 52 is in the form of a ring. The first feature 72 includes an interior surface 68 of said ring. The recess or void 74 is defined by a flat 82 on the exterior surface 83 of the ring.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bearing assembly for use in an electric machine, said assembly for cooperation with a bearing seat formed in a bearing housing, said assembly comprising:
   a bearing, said bearing including an inner ring, an outer ring and a rolling element in engagement with said inner ring and said outer ring; and
   an anti-rotation device, said anti-rotation device adapted for engagement with the outer ring of said bearing and with the bearing housing to limit the rotation of the outer ring of said bearing within the bearing seat formed in the bearing housing, said anti-rotation device including a first feature for engagement with the outer ring of said bearing and a second feature for engagement with the bearing housing, said first feature and said second feature adapted to limit the rotation of the outer ring of said bearing within the bearing seat formed in the bearing housing, said first feature and said second feature adapted to permit axial translation of the outer ring of said bearing with respect to the bearing seat formed in the bearing housing.

2. An assembly in accordance with claim 1:
   wherein said first feature comprises an internal surface for engagement with said outer ring of said bearing; and
   wherein said second feature comprises an engagement surface for engagement with a protrusion extending from the bearing housing.

3. An assembly in accordance with claim 2, where the internal surface of said anti-rotation device has an interference fit with said outer ring of said bearing.

4. An assembly in accordance with claim 1:
   wherein said anti-rotation device comprises a ring;
   wherein said first feature comprises an interior surface of said ring; and
   wherein said second feature comprises an exterior surface of said ring.

5. An assembly in accordance with claim 4, wherein said second feature comprises an engagement surface formed on the exterior surface of said ring.

6. An assembly in accordance with claim 5, wherein the engagement surface is defined by a flat on the exterior surface of said ring.

7. An assembly in accordance with claim 6, further comprising a second flat, located on the exterior surface of said ring and opposed to the first flat.

8. An anti-rotation device for use with a bearing in an electric machine, said anti-rotation device adapted for engagement with the outer ring of said bearing and with the bearing housing to limit the rotation of the outer ring of said bearing within the bearing seat formed in the bearing housing, said anti-rotation device including a first feature for engagement with the outer ring of said bearing and a second feature for engagement with the bearing housing, said first feature and said second feature adapted to limit the rotation of the outer ring of said bearing within the bearing seat formed in the bearing housing, said first feature and said second feature adapted to permit axial translation of the outer ring of said bearing with respect to the bearing seat formed in the bearing housing, said first feature including an internal surface for engagement with said outer ring of said bearing and said second feature including an engagement surface for engagement with a protrusion extending from the bearing housing.

9. An anti-rotation device in accordance with claim 8, where the internal surface of said anti-rotation device has an interference fit with said outer ring of said bearing.

10. An anti-rotation device in accordance with claim 8:
   wherein said anti-rotation device comprises a ring;
   wherein said first feature comprises an interior surface of said ring; and
   wherein said second feature comprises an exterior surface of said ring.

11. An anti-rotation device in accordance with claim 10, wherein said second feature comprises an engagement surface formed on the exterior surface of said ring.

12. An anti-rotation device in accordance with claim 11, wherein the engagement surface is defined by a flat on the exterior surface of said ring.

13. An anti-rotation device in accordance with claim 12, further comprising a second flat, located on the exterior surface of said ring and opposed to the first flat.

14. An electric machine comprising:
   a housing;
   a stator secured to said housing
   a rotor rotatable associated with said housing;
   a bearing having an inner ring and an outer ring, said bearing rotatably securing said rotor to said housing; and
   an anti-rotation device for use with said bearing, said bearing mounting in housing of an electric machine, said anti-rotation device adapted for engagement with the outer ring of said bearing and with the bearing housing to limit the rotation of the outer ring of said bearing within the bearing seat formed in the bearing housing, wherein said anti-rotation device includes a first feature for engagement with the outer ring of the bearing and a second feature for engagement with the bearing housing, said first feature and said second feature adapted to limit the rotation of the outer ring of the bearing within the bearing housing, said first feature and said second feature adapted to permit axial translation of the outer ring of said bearing with respect to the bearing seat formed in the bearing housing, wherein said first feature comprises an internal surface for engagement with said outer ring of said bearing and wherein said second feature comprises an engagement surface for engagement with a protrusion extending from the bearing housing.

15. An electric machine in accordance with claim 14, where the internal surface of said anti-rotation device has an interference fit with said outer ring of said bearing.

16. An electric machine in accordance with claim 14:
   wherein said anti-rotation device comprises a ring;
   wherein said first feature comprises an interior surface of said ring; and
   wherein said second feature comprises an exterior surface of said ring.

17. An electric machine in accordance with claim 16, wherein said engagement surface is defined by a flat on the exterior surface of said ring.

18. An electric machine in accordance with claim 17:
   Further comprising a second flat, located on the exterior surface of said ring and opposed to the first flat.

19. A method for containing a bearing in an electric machine, comprising:
   providing an anti-rotation device for use with a bearing having an inner ring and an outer ring;
   engaging the anti-rotation device with the outer ring of said bearing; and
   engaging the anti-rotation device with the bearing housing to limit the rotation of the outer ring of said bearing within the bearing seat formed in the bearing housing and to permit axial translation of the outer ring of the bearing with respect to the bearing housing.

20. A method for containing a bearing in accordance with claim 19, wherein said anti-rotation device comprises:
   a first feature for engagement with the outer ring of the bearing; and
   a second feature for engagement with the bearing housing, said first feature and said second feature adapted to limit the rotation of the outer ring of the bearing within the bearing housing, wherein said first feature comprises an internal surface for engagement with said outer ring of said bearing and wherein said second feature comprises an engagement surface for engagement with a protrusion extending from the bearing housing, wherein said anti-rotation device comprises a ring and wherein said first feature comprises an interior surface of said ring, wherein the engagement surface is defined by a flat on the exterior surface of said ring.

* * * * *